US012698396B2

(12) United States Patent
Nishikawa et al.

(10) Patent No.: US 12,698,396 B2
(45) Date of Patent: *Aug. 4, 2026

(54) BLUE PIGMENT AND METHOD FOR PRODUCING SAME

(71) Applicant: Glico Nutrition Co., Ltd., Osaka (JP)

(72) Inventors: Masahiro Nishikawa, Osaka (JP); Junya Yamashita, Osaka (JP); Kaori Miura, Osaka (JP); Kenichi Fujimori, Osaka (JP)

(73) Assignee: GLICO NUTRITION CO., LTD., Osaka (JP)

( * ) Notice: Subject to any disclaimer, the term of this patent is extended or adjusted under 35 U.S.C. 154(b) by 534 days.

This patent is subject to a terminal disclaimer.

(21) Appl. No.: 18/043,248

(22) PCT Filed: Aug. 28, 2020

(86) PCT No.: PCT/JP2020/032752
§ 371 (c)(1),
(2) Date: Feb. 27, 2023

(87) PCT Pub. No.: WO2022/044291
PCT Pub. Date: Mar. 3, 2022

(65) Prior Publication Data
US 2023/0303846 A1      Sep. 28, 2023

(51) Int. Cl.
*C09B 61/00*      (2006.01)
*A23L 5/43*      (2016.01)

(52) U.S. Cl.
CPC .............. *C09B 61/00* (2013.01); *A23L 5/43* (2016.08)

(58) Field of Classification Search
CPC .................................. C09B 61/00; A23L 5/43
See application file for complete search history.

(56) References Cited

U.S. PATENT DOCUMENTS

| | | | |
|---|---|---|---|
| 2013/0202703 A1 | 8/2013 | Sadano | |
| 2018/0258286 A1 | 9/2018 | Kasai | |
| 2021/0292567 A1 | 9/2021 | Horn et al. | |
| 2022/0195197 A1 | 6/2022 | Yamashita et al. | |

FOREIGN PATENT DOCUMENTS

| | | |
|---|---|---|
| EP | 3957689 A1 | 2/2022 |
| JP | 52-53934 A | 4/1977 |
| JP | 56-92792 A | 7/1981 |
| JP | 1-179690 A | 7/1989 |
| JP | 07111896 A | 5/1995 |
| JP | 2012-67241 A | 4/2012 |
| JP | 2018-536730 A | 12/2018 |
| JP | 7323322 B2 | 8/2023 |
| WO | 03029358 A1 | 4/2003 |
| WO | 2006082922 A1 | 8/2006 |
| WO | 2016045100 A1 | 3/2016 |
| WO | 2017057187 A1 | 4/2017 |
| WO | 2017156744 A1 | 9/2017 |
| WO | 2018029338 A1 | 2/2018 |

OTHER PUBLICATIONS

International Search Report for related International Application No. PCT/JP2020/032752 mailed Oct. 27, 2020 and ts English Translation.
Office Action (Rule63(1)) issued for Counterpart European Patent Application No. 20951541.0 (Issue date: Apr. 18, 2024).
Office Action for corresponding Japanese Application No. 2021-514883 Issued Mar. 12, 2024.

*Primary Examiner* — Katherine D Leblanc
(74) *Attorney, Agent, or Firm* — Renner, Otto, Boisselle & Sklar, LLP

(57) ABSTRACT

The purpose of the present invention is to provide: a *Gardenia* blue pigment which contains a product of a reaction between genipin and a compound having a primary amino group, and which offers a bright, fresh blue color tone having reduced redness; and a method for producing same. This *Gardenia* blue pigment, which offers a bright, fresh blue color tone having reduced redness, is obtained by carrying out a first step in which genipin and at least one peptide selected from the group consisting of soybean peptides, sesame peptides, and rice peptides are reacted in a solvent without supplying an oxygen-containing gas, and a second step in which a reaction liquid obtained in the first step is processed under an oxygen-containing gas supply.

5 Claims, No Drawings

BLUE PIGMENT AND METHOD FOR PRODUCING SAME

This application is a national phase of International Application No. PCT/JP2020/032752 filed Aug. 28, 2020, the entirety of which is hereby incorporated by reference.

TECHNICAL FIELD

The present invention relates to a blue pigment containing a reaction product of a primary amino group-containing compound and genipin and exhibiting a bright and fresh blue color tone having reduced redness. The present invention relates to a method for producing the blue pigment.

BACKGROUND ART

Conventionally, as blue colorants used for foods and the like, Food Blue No. 1 (disodium 2-(bis {4-[N-ethyl-N-(3-sulfonatophenylmethyl)amino]phenyl}methyliumyl)benzenesulfonate), a *Spirulina* pigment, a *Gardenia* blue pigment, and the like are known. Food Blue No. 1 and the *Spirulina* pigment are pigments that are bright, less reddish and more yellowish, and exhibit vivid blue, and have properties of having a fresh blue color tone. However, since Food Blue No. 1 is a synthetic colorant, the use of Food Blue No. 1 tends to be avoided along with an increase in consumer's awareness of food safety. The *Spirulina* pigment is a natural pigment, but has a drawback that it is easily discolored by heat and is also expensive. On the other hand, the *Gardenia* blue pigment is a natural pigment, is also stable to heat, overcomes the above-described drawbacks of Food Blue No. 1 and the *Spirulina* pigment, and is widely used in the food field and the like.

The *Gardenia* blue pigment is produced by causing β-glucosidase and a primary amino group-containing compound to act on an iridoid glycoside obtained from the fruit of *Gardenia* of the family Rubiaceae under an aerobic condition. However, since the *Gardenia* blue pigment obtained by such a producing method has insufficient brightness and is reddish, the *Gardenia* blue pigment cannot be sufficiently satisfactory in terms of color tone.

In this regard, conventionally, various techniques capable of improving the color tone of the *Gardenia* blue pigment have been studied.

For example, Patent Document 1 discloses that an iridoid glycoside derived from the fruit of *Gardenia* of the family Rubiaceae is treated with β-glucosidase in the presence of a casein decomposition product treated with a proline-specific endoprotease to obtain a *Gardenia* blue pigment having a bright blue color tone with reduced hues ranging from red to purple.

Patent Documents 2 and 3 disclose that a *Gardenia* blue pigment having a bright blue color tone is obtained by performing a) a step of treating geniposide with glucosidase to obtain a hydrolysis product, b) a step of extracting the hydrolysis product obtained in the step a) with a solvent to obtain a product containing genipin, and c) a step of reacting the product obtained in the step b) with an aqueous solution containing an amino acid and/or a salt thereof to produce a *Gardenia* blue pigment.

Patent Document 4 discloses that when a polyphenol is blended with a *Gardenia* blue pigment prepared by subjecting an iridoid glycoside obtained by extraction of the fruit of *Gardenia* of the family Rubiaceae to a β-glucosidase treatment in the presence of a proteolytic product, or a step of subjecting an iridoid glycoside obtained by extraction of the fruit of *Gardenia* of the family Rubiaceae to a β-glucosidase treatment in the presence of a proteolytic product and a polyphenol is performed, a *Gardenia* blue pigment having a bright blue color tone with reduced hues ranging from red to purple is obtained.

Patent Document 5 discloses that when a *Gardenia* blue pigment is produced by causing an aglycone of an iridoid glycoside and a taurine-containing substance to coexist under an aerobic condition, a polyphenol compound is added during or after the production, whereby a *Gardenia* blue pigment having a bright color tone is obtained.

However, in the techniques of Patent Documents 1 to 5, the obtained *Gardenia* blue pigment is still reddish, the color tone is still not satisfactory, and it is not possible to produce a *Gardenia* blue pigment having a bright blue color tone in which the redness is reduced to the same extent as that of Food Blue No. 1 or the *Spirulina* pigment.

It is also known that genipin (aglycone of an iridoid glycoside) is contained in the fruit of *Genipa americana* (also referred to as huito), and a blue pigment is obtained by causing genipin derived from *Genipa americana* and a primary amino group-containing compound to act under an aerobic condition. However, even a blue pigment using *Genipa americana* has a drawback that brightness is insufficient and the blue pigment is reddish as with the *Gardenia* blue pigment, and improvement in color tone is desired.

PRIOR ART DOCUMENTS

Patent Documents

Patent Document 1: WO 2006/82922 A
Patent Document 2: WO 2016/45100 A
Patent Document 3: WO 2017/156744 A
Patent Document 4: WO 2003/29358 A
Patent Document 5: Japanese Patent Laid-open Publication No. H7-111896

SUMMARY OF THE INVENTION

Problems to be Solved by the Invention

An object of the present invention is to provide a blue pigment containing a reaction product of a primary amino group-containing compound and genipin and exhibiting a bright and fresh blue color tone having reduced redness, and a method for producing the blue pigment.

Means for Solving the Problem

The present inventors have conducted intensive studies to solve the above problems and have found that a blue pigment, which exhibits a bright and fresh blue color tone having reduced redness, is obtained by performing a first step in which at least one peptide selected from the group consisting of a soybean peptide, a sesame peptide, and a rice peptide, and genipin are reacted in a solvent under a non-supply of an oxygen-containing gas, and a second step in which a reaction liquid obtained in the first step is treated under a supply of an oxygen-containing gas. The present inventors have found that when the blue pigment obtained by performing the first step and the second step is diluted with water to obtain a solution having a color value $E^{10\%}_{1\ cm}$ of 0.1, the blue pigment has an L* value of 66 or more, an a* value of −24 or less, and a b* value of −25 or more in an Lab color space, and exhibits the color tone similar to Food Blue No. 1. The present inventors have found that when the first step and the second step are performed using a rice peptide as a peptide to be added, the obtained blue pigment not only exhibits a bright and fresh blue color tone having reduced redness, but also can stably maintain the color tone even after heating under acidic conditions. The present inventors have conducted further studies based on the findings, leading to the completion of the present invention.

That is, the present invention provides inventions of the following aspects.

Item 1. A blue pigment containing a reaction product of a primary amino group-containing compound and genipin, in which when the blue pigment is diluted with water to obtain a solution having a color value $E^{10\%}{}_{1\,cm}$ of 0.1, an L* value is 66 or more, an a* value is –24 or less, and a b* value is –25 or more in an Lab color space.

Item 2. The blue pigment described in item 1, in which when operations (1) to (3) below are performed, a color difference $\Delta E^*{}_{ab}$ between a solution A heat-treated at 90° C. for 15 minutes and a solution B not heat-treated is 3.5 or less, and the solution A heat-treated at 90° C. for 15 minutes has an L* value of 64 or more, an a* value of –14 or less, and a b* value of –31 or more.

<Operation Conditions>

(1) Preparation

The blue pigment is diluted with a 0.1 M citrate buffer solution having a pH of 2.5 to prepare a solution A having a color value $E^{10\%}{}_{1\,cm}$ of 0.1. The blue pigment is diluted with a 0.1 M citrate buffer solution having a pH of 6.0 to prepare a solution B having a color value $E^{10\%}{}_{1\,cm}$ of 0.1.

(2) Heat Treatment of Solution

The solution A is heat-treated at 90° C. for 15 minutes. The solution B is not heat-treated.

(3) Measurement of Color Tone

The L* value, the a* value, and the b* value in the Lab color space are measured for the solution A heat-treated at 90° C. for 15 minutes and the solution B not heat-treated.

Item 3. The blue pigment described in item 1 or 2, in which a maximum absorption wavelength is present in a region of 604 nm or more.

Item 4. The blue pigment described in any one of items 1 to 3, in which the genipin is derived from *Gardenia* of the family Rubiaceae, *Genipa americana*, or a genetically modified microorganism.

Item 5. A food or beverage product colored with the blue pigment described in any one of items 1 to 4.

Item 6. A method for producing a blue pigment, the producing method including a first step and a second step below.

First step: at least one peptide selected from the group consisting of a soybean peptide, a sesame peptide, and a rice peptide, and genipin are reacted in a solvent under a non-supply of an oxygen-containing gas.

Second step: a reaction solution obtained in the first step is treated under a supply of an oxygen-containing gas.

Item 7. The producing method described in item 6, in which the genipin is derived from *Gardenia* of the family Rubiaceae, *Genipa americana*, or a genetically modified microorganism.

Item 8. The producing method described in item 6 or 7, in which the peptide has a ratio of a peptide having a molecular weight of 2000 or less of 45% or more and a free amino acid content of less than 20 mass %.

Item 9. The producing method described in any one of items 6 to 8, in which in the first step, a polyphenol is further caused to coexist in the solvent.

Item 10. The producing method described in any one of items 6 to 9, in which air is used as the oxygen-containing gas.

Advantages of the Invention

According to the present invention, it is possible to produce a blue pigment containing a reaction product of a primary amino group-containing compound and genipin and exhibiting a bright and fresh blue color tone having reduced redness by a simple method. Since the blue pigment of the present invention exhibits a blue color tone close to that of Food Blue No. 1 even when a naturally-derived component such as *Gardenia* of the family Rubiaceae or *Genipa americana* is used, various products such as foods can be colored with high safety in a favorable color tone.

In an aspect of the present invention, there is provided a blue pigment having a property of stably maintaining a color tone even after heating under acidic conditions in addition to a bright and fresh blue color tone having reduced redness, so that acidic foods can also be colored in a favorable color tone.

EMBODIMENTS OF THE INVENTION

1. Blue Pigment

A blue pigment of the present invention contains a reaction product of a primary amino group-containing compound and genipin, in which when the blue pigment is diluted with water to obtain a solution having a color value $E^{10\%}{}_{1\,cm}$ of 0.1, an L* value is 66 or more, an a* value is –24 or less, and a b* value is –25 or more in an Lab color space. Hereinafter, the blue pigment of the present invention will be described in detail.

1-1. Reaction Product of Primary Amino Group-Containing Compound and Genipin

Primary Amino Group-Containing Compound

The blue pigment of the present invention contains a reaction product of a primary amino group-containing compound and genipin as a component exhibiting blue.

The primary amino group-containing compound is not particularly limited as long as it can exhibit blue by reaction with genipin and satisfy the color tone properties described below, and examples thereof include amino acids, peptides, and proteins. The primary amino group-containing compound may be used singly or in combination of two or more kinds thereof.

Among these primary amino group-containing compounds, a soybean peptide, a sesame peptide, and a rice peptide are preferable from the viewpoint of suitably imparting color tone properties described below. The soybean peptide, the sesame peptide, and the rice peptide will be described.

The soybean peptide is a peptide obtained by hydrolyzing a protein derived from soybeans to reduce the molecular weight thereof. Hydrolysis of a protein derived from soybeans is not particularly limited, and can be performed by a known method such as a protease treatment, an acid treatment, and an alkali treatment. As the soybean peptide, a commercially available product may be used.

The sesame peptide is a peptide obtained by hydrolyzing a protein derived from sesames to reduce the molecular weight thereof. Hydrolysis of a protein derived from sesames is not particularly limited, and can be performed by a known method such as a protease treatment, an acid treatment, and an alkali treatment. As the sesame peptide, a commercially available product may be used.

The rice peptide is a peptide obtained by hydrolyzing a protein derived from rice to reduce the molecular weight thereof. Hydrolysis of a protein derived from rice is not particularly limited, and can be performed by a known method such as a protease treatment, an acid treatment, and an alkali treatment. As the rice peptide, a commercially available product may be used. As described above, when the rice peptide is used as the primary amino group-containing compound, it is possible to produce a blue pigment not only exhibiting a bright and fresh blue color tone having reduced redness but also having acid heating resistance.

The average molecular weight of the soybean peptide, the sesame peptide, and the rice peptide used in the present invention is not particularly limited, and is, for example, about 5000 or less, preferably about 150 to 3000, and more preferably about 150 to 2000. As the molecular weight distribution in the soybean peptide, the sesame peptide, and the rice peptide, a peptide having a molecular weight of 2000 or less accounts for about 45% or more, preferably about 50 to 100%, and more preferably about 60 to 100%. When a peptide having a molecular weight of 2000 or less is contained at such a ratio, it is possible to further improve the brightness of the blue pigment and further reduce redness. In the present invention, the average molecular weight of the peptide is a weight average molecular weight calculated by a gel filtration chromatography method using HPLC by using a peptide having a known molecular weight as a standard substance. The proportion of the peptide having a molecular weight of 2000 or less is the proportion of the peak area of the peptide having a molecular weight of 2000 or less to the total peak area.

In the peptide, free amino acids (amino acids not bonded to the peptide and present alone) generated when a protein is hydrolyzed may be mixed. When the soybean peptide, the sesame peptide, and the rice peptide contain a large amount of such free amino acids, the brightness of the blue pigment may be reduced or the redness may be enhanced. Therefore, the soybean peptide, the sesame peptide, and the rice peptide used in the present invention desirably have a small amount of free amino acid, and for example, the content of free amino acid is less than 20 mass %, preferably 10 mass % or less, and more preferably 5 mass % or less.

Genipin

The genipin is an aglycone of geniposide (iridoid glycoside). The origin of the genipin is not particularly limited, and examples thereof include genipin derived from *Gardenia* of the family Rubiaceae, *Genipa americana*, and a genetically modified microorganism. Hereinafter, the genipin used in the present invention will be described for each origin.

(Genipin Derived from *Gardenia* of Family Rubiaceae)

The genipin derived from *Gardenia* of the family Rubiaceae can be obtained by causing β-glucosidase to act on geniposide obtained by an extraction treatment from the fruit of *Gardenia* of the family Rubiaceae.

The fruit of *Gardenia* of the family Rubiaceae used for the extraction of geniposide may be either undried, dried, or frozen, and may be finely cut or pulverized in order to increase the extraction efficiency.

Examples of an extraction solvent used for the extraction of geniposide include water, an organic solvent, and a mixed solvent thereof. The organic solvent is preferably a hydrophilic organic solvent, and examples thereof include monohydric alcohols having 1 to 5 carbon atoms (such as ethanol, methanol, propanol, and isopropanol), and polyhydric alcohols having 2 to 5 carbon atoms (such as glycerin, isopropylene glycol, propylene glycol, and 1,3-butylene glycol).

Among these extraction solvents, from the viewpoint of safety and the extraction efficiency of geniposide, water, a monovalent lower alcohol, and a mixed solvent thereof are preferred, water, ethanol, and hydrous ethanol (mixed solvent of water and ethanol) are more preferred, and hydrous ethanol is further preferred. When a mixed solvent of a monovalent lower alcohol and water is used as the solvent, the mixing ratio of the monovalent lower alcohol and water is not particularly limited, but for example, the concentration of the monovalent lower alcohol may be about 1 to 99 mass %, preferably about 40 to 90 mass %, and more preferably about 50 to 80 mass %.

The extraction method is not particularly limited as long as it is a general solvent extraction method, and examples thereof include a method in which an original drug is immersed in an extraction solvent by cold immersion, warm immersion, or the like, and stirred as necessary, a percolation method, and the like.

Geniposide can be recovered by removing solids from an extraction liquid obtained by the extraction treatment by filtration, centrifugation, or the like as necessary. The recovered geniposide may be subjected to a purification treatment such as an adsorption treatment, gel filtration, or crystallization as necessary to increase the purity.

The β-glucosidase to be used for producing genipin from geniposide may be an enzyme having β-glucosidase activity, and examples thereof include those derived from *Aspergillus niger, Trichoderma reesei, Trichoderma viride*, almond, and the like. As the enzyme having β-glucosidase activity, a commercially available product can be used. Examples of commercially available products of the enzyme having β-glucosidase activity include Sumizyme C6000, Sumizyme AC, Sumizyme C, Sumizyme X, Sumizyme BGT, and Sumizyme BGA (trade name; manufactured by SHINNIHON CHEMICALS Corporation), Cellulosin AC40, Cellulosin T3, and Cellulosin AL (trade name; manufactured by HBI Enzymes Inc.) ONOZUKA 3S and Y-NC (trade name; manufactured by Yakult Pharmaceutical Industry Co., Ltd.), and Cellulase A "Amano" 3 and Cellulase T "Amano" 4 (trade name; manufactured by Amano Enzyme Inc.).

In order to cause β-glucosidase to act on geniposide to produce genipin, β-glucosidase and geniposide may be caused to coexist under conditions where β-glucosidase can act. The amount of β-glucosidase used may be appropriately set according to the conditions such as the geniposide concentration, the reaction temperature, and the reaction time.

The temperature condition for causing β-glucosidase to act may be appropriately set within a range of the action temperature of β-glucosidase, and is, for example, about 30 to 60° C. and preferably about 40 to 50° C.

The pH condition for causing β-glucosidase to act may be appropriately set within a pH range of the action temperature of β-glucosidase, and is, for example, about pH 3.5 to 6.0 and preferably about pH 4.3 to 4.8.

Examples of the reaction solvent when β-glucosidase is caused to act include water; and buffer solutions such as a phosphate buffer solution, a citrate buffer solution, a tris buffer solution, a tartrate buffer solution, and a borate buffer solution.

The time for which β-glucosidase is caused to act may be appropriately set according to the amount of β-glucosidase or geniposide to be used, temperature conditions, and the like, and is, for example, about 3 to 30 hours and preferably about 5 to 24 hours.

(Genipin Derived from *Genipa americana*)

The genipin derived from *Genipa americana* can be obtained by an extraction treatment from the fruit of *Genipa americana*.

*Genipa americana* is a plant that grows naturally mainly in the tropical rainforest of South America and the Amazon watershed, and is known under many unofficial names, including genipap, huito, jagua, bilito, cafecillo denta, caruto, caruto rebalsero, confiture de singe, genipayer bitu, guaitil, guaricha, guayatil colorado, huitol, huitoc, huitu, irayol, jagua blanca, jagua amarilla, jagua colorado, jeipapeiro, juniper, maluco, mandipa, marmelade-box, nandipa, nyandipa genipapo, tapaculo, tapoeripa, taproepa totumillo, yagua, yanupa-i, yenipa-i, yenipapa bi, genipapo, huitoc, vito, chipara, guanapay, or other anonyms (such as jenipaporana or jenipapo-bravo).

The fruit of *Genipa americana* used for the extraction of genipin may be either undried, dried, or frozen, and may be finely cut or pulverized in order to increase the extraction efficiency.

Examples of an extraction solvent used for the extraction of genipin include water, a polar organic solvent, and a mixed solvent thereof. Examples of the polar organic solvent include monohydric alcohols having 1 to 5 carbon atoms (such as ethanol, methanol, propanol, and isopropanol), and polyhydric alcohols having 2 to 5 carbon atoms (such as glycerin, isopropylene glycol, propylene glycol, and 1,3-butylene glycol), esters (such as methyl acetate and ethyl acetate), and ketones (such as acetone). Among these extraction solvents, from the viewpoint of safety and the extraction efficiency of an active ingredient, water, a monovalent lower alcohol, and a mixed solvent thereof are preferred, water, ethanol, and hydrous ethanol (mixed solvent of water and ethanol) are more preferred, and hydrous ethanol is further preferred. When a mixed solvent of a monovalent lower alcohol and water is used as the solvent, the mixing ratio of the monovalent lower alcohol and water is not particularly limited, but for example, the concentration of the monovalent lower alcohol may be about 1 to 99 mass %, preferably about 40 to 90 mass %, and more preferably about 50 to 80 mass %.

The extraction method is not particularly limited as long as it is a general solvent extraction method, and examples thereof include a method in which an original drug is immersed in an extraction solvent by cold immersion, warm immersion, or the like, and stirred as necessary, a percolation method, and the like.

Genipin can be recovered by removing solids from an extraction liquid obtained by the extraction treatment by filtration, centrifugation, or the like as necessary. The recovered genipin may be subjected to a purification treatment such as an extraction treatment, an adsorption treatment, gel filtration, or crystallization using a nonpolar solvent (such as acetate, ethyl acetate, or acetone) to increase the purity as necessary.

The genipin derived from *Genipa americana* may be obtained by causing β-glucosidase to act on geniposide obtained by an extraction treatment from the fruit of *Genipa americana*. The conditions for causing the β-glucosidase to act on the geniposide obtained from the *Genipa americana* are the same as those in the case of genipin derived from *Gardenia* of the family Rubiaceae.

(Genipin Derived from Genetically Modified Microorganism)

The genipin derived from a genetically modified microorganism can be obtained by culturing a microorganism genetically modified so at to be able to produce genipin. The genipin derived from a genetically modified microorganism can also be obtained by culturing a genetically modified microorganism capable of producing geniposide to obtain geniposide, and then causing β-glucosidase to act on the geniposide. The conditions for causing the β-glucosidase to act on the geniposide obtained from the genetically modified microorganism are the same as those in the case of genipin derived from *Gardenia* of the family Rubiaceae.

1-2. Color Tone Properties

In the present invention, the "color value $E^{10\%}_{1\,cm}$" is a unit representing the color density of a pigment, and refers to a value obtained by converting the absorbance of the maximum absorption wavelength measured using a cell having an optical path length of 1 cm in a reliable concentration range by an absorptiometer into a value in a 10 wt % solution.

Since the maximum absorption wavelength of the blue pigment is around 600 nm, the color value $E^{10\%}_{1\,cm}$ of the blue pigment can be determined by specifying the maximum absorption wavelength around 600 nm and measuring the absorbance, but when there is no maximum absorption wavelength, the absorbance at 600 nm may be measured.

A solution of the blue pigment having a color value $E^{10\%}_{1\,cm}$ of 0.1 is prepared by diluting the blue pigment with water (preferably ion-exchanged water). In the present invention, the color value $E^{10\%}_{1\,cm}$ of 0.1 indicates that the value of the color value $E^{10\%}_{1\,cm}$ is rounded off to the fourth decimal place to be 0.100.

When the blue pigment of the present invention is diluted with water to obtain a solution having a color value $E^{10\%}_{1\,cm}$ of 0.1, the L* value in the Lab color space (CIE L*a*b* color space) is 66 or more, and the blue pigment exhibits a bright blue color tone. From the viewpoint of exhibiting a brighter blue color tone, the L* value is preferably 66 to 75, more preferably 67 to 75, and further preferably 68 to 73.

When the blue pigment of the present invention is diluted with water to obtain a solution having a color value $E^{10\%}_{1\,cm}$ of 0.1, the a* value in the Lab color space is −24 or less, and the blue pigment exhibits a blue color tone with less redness. From the viewpoint of exhibiting a blue color tone with further reduced redness, the a* value is preferably −35 to −24, more preferably −35 to −25, and further preferably −32 to −26.

When the blue pigment of the present invention is diluted with water to obtain a solution having a color value $E^{10\%}_{1\,cm}$ of 0.1, the blue pigment exhibits a blue color tone having a b* value of −25 or more in the Lab color space. The b* value is preferably −25 to −15, more preferably −24 to −15, and further preferably −23 to −18.

Since the c* value (chroma) in the Lab color space is calculated by $(a^* \text{ value}^2 + b^* \text{ value}^2)^{1/2}$, in the blue pigment of the present invention, the c* value (chroma) in the Lab color space when the blue pigment is diluted with water to obtain a solution having a color value $E^{10\%}_{1\,cm}$ of 0.1 is determined within a range satisfying the a* value and the b* value, and is, for example, 34 or more, preferably 35 to 40, more preferably 36 to 40, and further preferably 37 to 40.

In the blue pigment of the invention, the h* value (hue) in the Lab color space when the blue pigment is diluted with water to obtain a solution having a color value $E^{10\%}_{1\,cm}$ of 0.1 is not particularly limited, but is, for example, 230 or less, preferably 205 to 228, more preferably 205 to 225, and further preferably 205 to 220.

The blue pigment of the present invention satisfying such color tone properties can be obtained by a producing method described below.

A naturally-derived blue pigment such as a conventional *Gardenia* blue pigment has a drawback that when heated under acidic conditions, redness becomes stronger and the color tone changes; however, when a rice peptide is used as a peptide to be added in a first step in a producing method described below, a blue pigment can be obtained which has the above-described color tone, is free from the drawback of the conventional naturally-derived blue pigment, and has the property of stably maintaining the color tone even after heating under acidic conditions (hereinafter, also referred to as "acid heating resistance").

Specific examples of the blue pigment of the present invention having such acid heating resistance include those in which when operations (1) to (3) below are performed, a color difference $\Delta E^*_{ab}$ between a solution A heat-treated at 90° C. for 15 minutes and a solution B not heat-treated is 3.5 or less, and the solution A heat-treated at 90° C. for 15 minutes has an L* value of 64 or more, an a* value of −14 or less, and a b* value of −31 or more.

<Operation Conditions>

(1) Preparation

The blue pigment is diluted with a 0.1 M citrate buffer solution having a pH of 2.5 to prepare a solution A having a color value $E^{10\%}_{1\ cm}$ of 0.1. The blue pigment is diluted with a 0.1 M citrate buffer solution having a pH of 6.0 to prepare a solution B having a color value $E^{10\%}_{1\ cm}$ of 0.1.

(2) Heat Treatment of Solution

The solution A is heat-treated at 90° C. for 15 minutes. The solution B is not heat-treated.

(3) Measurement of Color Tone

The L* value, the a* value, and the b* value in the Lab color space are measured for the solution A heat-treated at 90° C. for 15 minutes and the solution B not heat-treated.

The color difference $\Delta E^*_{ab}$ between the solution A heat-treated at 90° C. for 15 minutes and the solution B not heat-treated may be 3.5 or less, and is preferably 3.0 or less, more preferably 0 to 2.5, and further preferably 0 to 2.0, from the viewpoint of imparting more excellent acid heating resistance.

The L* value of the solution A treated at 90° C. for 15 minutes may be 64 or more, and is preferably 65 or more, more preferably 65 to 70, and further preferably 66 to 70, from the viewpoint of imparting more excellent acid heating resistance.

The a* value of the solution A treated at 90° C. for 15 minutes may be −14 or less, and is preferably −15 or less, more preferably −26 to −16, and further preferably −26 to −17, from the viewpoint of imparting more excellent acid heating resistance.

The b* value of the solution A treated at 90° C. for 15 minutes may be −31 or more, and is preferably −30 or more, more preferably −29 to −22, and further preferably −28 to −22, from the viewpoint of imparting more excellent acid heating resistance.

In the present invention, each of the values in the Lab color space is a value measured using a spectrophotometric colorimeter (CM-5 Konica Minolta, Inc.). As measurement conditions, a light source is D65, a visual field is 10° C., a measurement diameter is φ20 mm, and an irradiation diameter is φ26 mm in the total transmission measurement.

Although the maximum absorption wavelength of a naturally-derived blue pigment such as a conventional *Gardenia* blue pigment is around 600 nm, the maximum absorption wavelength of the blue pigment of the present invention may be, for example, 604 nm or more, and may be within a range of preferably 604 to 610 nm, more preferably 605 to 610 nm, and further preferably 607 to 610 nm or 608 to 610 nm.

1-3. Use Application

The blue pigment of the present invention is used as a blue colorant. A product to which the blue pigment of the present invention is to be used is not particularly limited as long as the use of the blue colorant is required, and specific examples thereof include food or beverage products, cosmetics, oral agents, and pharmaceuticals. In a preferred aspect of the blue pigment of the present invention, the blue pigment is naturally derived and has high safety, and thus is particularly suitable as a colorant for food or beverage products.

The type of the food or beverage products to be colored with the blue pigment of the present invention is not particularly limited as long as it is required to be colored in blue, and examples thereof include confectionery such as jelly, gum, gummy, agar, cake, cookie, and tablet confectionery; Japanese confectionery such as dumpling, rice cake, bracken-starch dumpling, and bean jam; processed fruit items such as fruit sauce; jams such as strawberry jam and blueberry jam; syrup; seasoning such as sweet sake, cooking sake, dressing and sauce, and sauce; frozen confectionery such as ice cream, ice milk, and ice confectionery; dairy products such as yogurt, ice cream, and whipped cream; fish paste products such as fish minced and steamed, tubular roll of boiled fish paste, fish meat sausages, and fish meat minced meat; bottling and canning of meat, fish, fruits and the like; beverages such as *lactobacillus* beverages, soft drinks, carbonated beverages, fruit juice beverages, non-fruit juice beverages, fruit beverages, vegetable beverages, sports beverages, powdered beverages, drink jellies, and alcoholic beverages; pickles; and noodles.

When the blue pigment of the present invention has acid heating resistance, the blue pigment can be suitably used for acidic food or beverage products, particularly acidic food or beverage products for which heat sterilization is performed in the production process. In the present invention, the acidic food or beverage products refer to food or beverage products having a pH of 5.0 or less.

When the blue pigment of the present invention has acid heating resistance, the pH of an acidic food or beverage product to be colored is not particularly limited as long as it is in a range of 5.0 or less, but for example, even an acidic food or beverage product having a pH of 4.0 or less can exhibit a stably maintained color tone. Specific examples of the acidic food or beverage products include acidic beverages such as *lactobacillus* beverages, soft drinks, carbonated beverages, fruit juice beverages, non-fruit juice beverages, fruit beverages, vegetable beverages, sports beverages, drink jellies, and alcoholic beverages; dairy products such as yogurt, ice cream, and whipped cream; desserts such as jellies; frozen confectionery such as sherbet, ice milk, and ice confectionery; confectionery such gummy and jelly beans; jams such as strawberry jam and blueberry jam; sauces such as flavor sauce of fruit; pickles; and seasoning such as dressing.

The type of the cosmetics to be colored with the blue pigment of the present invention is not particularly limited as long as it is required to be colored in blue, and examples thereof include basic cosmetics such as a cream, an emulsion, a skin toner, a serum, an ointment, an oil, a pack, a lotion, and a gel; and makeup cosmetics such as foundation, eyeshadow, lipstick, and blush.

The type of the oral agents to be colored with the blue pigment of the present invention is not particularly limited as long as it is required to be colored in blue, and examples thereof include dentifrices such as a toothpaste, a powder dentifrice, and a liquid dentifrice; tooth cream; tooth washes such as mouthwash and oral rinse; oral pasta agents, mouth sprays, orally disintegrating films, gels, troches, tablets, and chewables.

The type of the pharmaceuticals to be colored with the blue pigment of the present invention is not particularly limited as long as it is required to be colored in blue, and examples thereof include powders, granules, tablets, capsules, pills, and solutions.

The amount of the blue pigment of the present invention to be added to a product to be colored may be appropriately set according to the type of the product and the degree of coloring to be applied to the product.

2. Method for Producing Blue Pigment

A method for producing a blue pigment of the present invention is not particularly limited as long as a blue pigment containing a reaction product of a primary amino group-containing compound and genipin and satisfying the above-described color tone properties is obtained, but as a suitable producing method, a method including a first step and a second step described below is exemplified. First step: at least one peptide selected from the group consisting of a soybean peptide, a sesame peptide, and a rice peptide, and genipin are reacted in a solvent under a non-supply of an oxygen-containing gas.

Second step: a reaction solution obtained in the first step is treated under a supply of an oxygen-containing gas.

Hereinafter, the producing method including a first step and a second step will be described in detail.

2-1. First Step

Peptide

In the first step, at least one selected from the group consisting of a soybean peptide, a sesame peptide, and a rice peptide is used as the primary amino group-containing compound. The soybean peptide, the sesame peptide, and the rice peptide to be used are as described in the section of "1. Blue Pigment" above.

Genipin

The genipin used in the first step is as described in the section of "1. Blue Pigment" above.

For example, when genipin derived from *Gardenia* of the family Rubiaceae is used, a reaction liquid in which β-glucosidase is caused to act on geniposide obtained by an extraction treatment from the fruit of *Gardenia* of the family Rubiaceae to produce genipin may be used in the first step as a geniposide-containing solution as it is, or may be subjected to a purification treatment, a concentration treatment, a drying treatment, or the like as necessary to be used in the first step as a concentrated liquid or a dried product.

For example, when genipin derived from *Genipa americana* is used, a genipin extraction liquid obtained by an extraction treatment from the fruit of *Genipa americana* may be used in the first step as a geniposide-containing solution as it is, or may be subjected to a purification treatment, a concentration treatment, a drying treatment, or the like as necessary to be used in the first step as a concentrated liquid or a dried product.

Polyphenol

In the first step, the reaction may be performed by causing a polyphenol to coexist together with the specific peptide and the genipin. The polyphenol is a compound having a plurality of phenolic hydroxyl groups in the molecule. The origin of the polyphenol to be used is not particularly limited, and the polyphenol may be derived from a plant, produced by a microorganism, chemically synthesized, or the like.

The type of the polyphenol is not particularly limited, and the polyphenol may be either a flavonoid-based polyphenol or a non-flavonoid-based (phenolic acid-based) polyphenol. Examples of the flavonoid-based polyphenol include flavanones, flavones, flavonols, flavanols, flavanonols, isoflavones, anthocyanins, chalcones, and stilbenoids.

Specific examples of the flavanones include hesperidin, transglycosylated hesperitin, hesperetin, narizine, and liquiritigenin. Transglycosylated hesperidin is a hesperidin derivative in which a monosaccharide or oligosaccharide such as glucose, arabinose, galactose, rutinose, sophorose, or glucuronic acid is transferred to a hydroxyl group of hesperidin, and specific examples thereof include α-monoglucosyl hesperidin, α-diglucosyl hesperidin, α-triglucosyl hesperidin, α-tetraglucosyl hesperidin, and α-pentaglucosyl hesperidin.

Specific examples of the flavones include flavone, apigenin, luteonine, apigenidin, luteionidine, and baicalein.

Specific examples of the flavonols include quercetin, kaempferol, and myricetin.

Specific examples of the flavanols include catechin (such as epicatechin, epicatechin gallate, epigallocatechin, epigallocatechin gallate, and theaflavin), theaflavin, and leucoanthocyanidin.

Specific examples of the flavanonols include alpinone and taxifolin.

Specific examples of the isoflavones include genistein, daidzein, daidzin, glycitein, equol, biochanin A, coumestrol, puerarin, and formononetin.

Specific examples of the anthocyanins include pelargonidin, cyanidin, petunidin, peonidin, petunidin, delphinidin, and malvidin.

Specific examples of the chalcones include cartamine and proretin.

Specific examples of the stilbenoids include resveratrol.

Examples of the non-flavonoid-based polyphenol include ellagic acid, coumarin, curcumin, chlorogenic acid, lignan, and sesamine.

These polyphenols may be used singly or in combination of two or more kinds thereof.

Among these polyphenols, flavanones are preferred, hesperidin, transglycosylated hesperitin, and hesperetin are more preferred, and transglycosylated hesperitin is further preferred.

The polyphenol may be in a purified state or in a state where other components are mixed (for example, an extract or the like).

Reaction

In the first step, the specific peptide and the genipin are caused to coexist and reacted in a solvent under a non-supply of an oxygen-containing gas. When the specific peptide, the geniposide, and the β-glucosidase are simultaneously caused to coexist under a non-supply of a gas, and the reaction for producing genipin from geniposide and the reaction between the peptide and the genipin are simultaneously caused to proceed, a blue pigment having the color tone properties described above cannot be obtained. Therefore, when genipin obtained by causing β-glucosidase to act on geniposide is used, it is important to perform the first step after the reaction of β-glucosidase is completed.

As the concentration of the specific peptide and the genipin at the start of reaction, for example, the specific peptide is about 1 to 50 mass %, preferably about 5 to 30 mass %, and more preferably about 10 to 20 mass %, and the concentration of the genipin is about 0.1 to 50 mass %, preferably about 1 to 20 mass %, and more preferably about 2.5 to 10 mass %.

As the ratio of the genipin and the specific peptide at the start of reaction is, for example, the specific peptide is about 20 to 1000 parts by mass, preferably about 100 to 600 parts by mass, and more preferably about 200 to 300 parts by mass, per 100 parts by mass of genipin.

When a polyphenol is also caused to coexist, the concentration of the polyphenol at the start of reaction is, for example, about 0.01 to 10 mass %, preferably about 0.025 to 5 mass %, and more preferably about 0.5 to 1 mass %. When a polyphenol is also caused to coexist, as the ratio of the genipin and the polyphenol at the start of reaction, for example, the polyphenol is about 0.2 to 220 parts by mass, preferably about 0.5 to 110 parts by mass, and more preferably about 1 to 22 parts by mass, per 100 parts by mass of the genipin.

The pH when the specific peptide and the genipin are reacted is, for example, about 5 to 10, preferably about 6 to 9, and more preferably about 7 to 8. During the reaction, the pH may be adjusted so as to be kept constant in these pH ranges.

Examples of the solvent for reacting the specific peptide and the genipin include water; and buffer solutions such as a phosphate buffer solution, a citrate buffer solution, a tris buffer solution, a tartrate buffer solution, and a borate buffer solution.

In the first step, the specific peptide and the genipin can be caused to coexist and react in a solvent by a method of adding the genipin to a solution in which the specific peptide is dissolved, a method of adding the specific peptide to a solution in which the genipin is dissolved, or the like. When a reaction liquid (genipin-containing solution) in which genipin is produced by the action of β-glucosidase is used, the specific peptide may be added to the reaction liquid.

In the first step, the reaction is performed in a state where the specific peptide and the genipin are caused to coexist in a solvent without supplying an oxygen-containing gas. In order to perform a reaction without supplying an oxygen-containing gas, for example, the reaction can be performed by a method in which the specific peptide and the genipin are left to stand still in an air atmosphere where gentle stirring to the extent that air is not taken in is performed or without stirring is performed (hereinafter, referred to as a first method); a method in which the specific peptide and the genipin are stirred in an atmosphere of an inert gas such as nitrogen gas or argon gas or are left to stand still; a method of supplying an inert gas such as nitrogen gas or argon gas into a liquid, or the like. Among these methods, the first method is suitable because preparation of an inert gas or a special device is not required and the method is simple.

The temperature at the time of the reaction in the first step is, for example, about 5 to 50° C., preferably about 10 to 45° C., and more preferably about 20 to 40° C.

The reaction time in the first step is, for example, about 1 hour or longer, preferably about 3 to 24 hours, and more preferably about 5 to 20 hours.

[Second Step]

In the second step, a reaction liquid obtained in the first step is treated under a supply of an oxygen-containing gas. The reaction liquid obtained in the first step may be directly subjected to the second step, or may be subjected to the second step after the pH is adjusted to about 5 to 10, preferably about 6 to 9, and more preferably about 7 to 8. During the reaction, the pH may be adjusted so as to be kept constant in these pH ranges.

The oxygen-containing gas used in the second step may be an oxygen gas itself, but for example, a gas containing a gas component other than oxygen such as air may be used.

From the viewpoint of reducing the manufacturing cost and the like, air is preferably mentioned as the oxygen-containing gas.

In order to supply an oxygen-containing gas to the reaction liquid obtained in the first step, the supply is performed by a method of directly introducing an oxygen-containing gas into the reaction liquid and performing stirring as necessary; a method of stirring the reaction liquid in an atmosphere of an oxygen-containing gas such that the oxygen-containing gas enters the reaction liquid, or the like.

The supply amount of the oxygen-containing gas may be the same as in the aerobic conditions (conditions at the time of color development) employed in the production of the conventional *Gardenia* blue pigment and the like, and is appropriately set according to the size of the device for performing the second step, the presence or absence of stirring during the supply of the oxygen-containing gas, the stirring speed, and the like, and for example, the supply amount of the oxygen-containing gas is 0.01 to 5.0 vvm, preferably 0.05 to 2.5 vvm, and further preferably 0.1 to 1.0 vvm. The unit "vvm" of the supply amount of the oxygen-containing gas refers to the amount of gas supplied in one minute per 1 L of the reaction liquid obtained in the first step. The supply amount of the oxygen-containing gas exemplified here refers to the supply rate of air itself. That is, for example, when a pure oxygen gas is used as the oxygen-containing gas, since about 20 volume % of oxygen is contained in the air, an oxygen gas in an amount of 20 volume % of the supply amount may be supplied.

The temperature at the time of supplying the oxygen-containing gas is, for example, about 5 to 50° C., preferably about 10 to 45° C., and more preferably about 20 to 40° C. The temperature during the second step may be constant, but may be varied in these ranges during the reaction.

In the second step, the supply of the oxygen-containing gas may be performed until the color value of the solution becomes constant, but may be stopped when a desired color tone is exhibited. The supply time of the oxygen-containing gas is specifically 1 hour or longer, preferably about 3 to 120 hours, more preferably about 6 to 50 hours, and further preferably about 12 to 40 hours.

Thus, by performing the second step, the blue pigment exhibiting a bright and fresh blue color tone having reduced redness is generated. The reaction liquid after the second step may be used as it is as a blue pigment solution, but may be subjected to a purification treatment, a concentration treatment, a drying treatment, or the like as necessary to form a concentrated liquid or a dried product of the blue pigment.

EXAMPLES

Hereinafter, the present invention will be specifically described on the basis of Examples and the like; however, the present invention is not limited thereto.

Test Example 1

1. Production of *Gardenia* Blue Pigment (Using Jar Fermenter) (Examples 1-1 to 1-3 and Comparative Examples 1-1 to 1-15)

(1) Preparation of Genipin

First, a geniposide solution (color value $E^{10\%}_{1\ cm}$: 1335.48, measurement wavelength: 238 nm; geniposide content: about 45 mass %) extracted and purified from the fruit of *Gardenia* of the family Rubiaceae was prepared. In 110 g of purified water, 11.0 g of β-glucosidase activity containing cellulase (Sumizyme C, 1500 U/g, SHINNIHON CHEMICALS Corporation) was dissolved, and 110 g of the geniposide solution (color value $E^{10\%}_{1\ cm}$ at the start of reaction: 245, measurement wavelength: 238 nm; geniposide concentration at the start of reaction: about 0.2 mol/L) was added. Next, the pH of the solution was adjusted to 4.5, and then an enzymatic reaction was performed at 50° C. for 18 hours to obtain a genipin-containing solution (solution after the reaction).

(2) Reaction Under Oxygen Gas Non-Supply Condition

To 283 g of water, 5.5 g of monosodium hydrogen phosphate dihydrate, 4.27 g of trisodium phosphate (anhydrous), and 76.1 g of a peptide or amino acid shown in Table 1 were added and dissolved. The obtained solution was mixed with the genipin-containing solution (total amount) obtained above, and the pH was further adjusted to 7.5. The obtained solution was transferred to a jar fermenter (BMJ-01NC: ABLE Corporation) with a 1 L capacity, and reacted in an air-impermeable state at 35° C. for 15 hours under a gentle stirring condition in which air was not taken in.

(3) Reaction under Oxygen Gas Supply Condition

The reaction liquid after the reaction under the oxygen gas non-supply condition was adjusted to pH 7.0, and then the reaction was performed under stirring conditions of 35° C. and 420 rpm while supplying air into the reaction liquid at a supply amount of 0.25 vvm until an increase in the color value leveled off. The reaction time was 24 to 48 hours although the reaction time was different depending on the type of the peptide or amino acid used. Thus, a *Gardenia* blue pigment-containing solution (solution after the reaction) was obtained.

2. Measurement of Color Tone of *Gardenia* Blue Pigment

The obtained *Gardenia* blue pigment-containing solution was filtered, the pigment solution from which the insoluble matter had been removed was diluted with ion-exchanged water to prepare a solution having a color value $E^{10\%}_{1\ cm}$ of 0.1. The color tone of this solution was measured using a spectrophotometric colorimeter (CM-5 Konica Minolta, Inc.). As measurement conditions, a light source was set to D65, a visual field was set to 10° C., a measurement diameter was set to φ20 mm, and an irradiation diameter was set to φ26 mm in the total transmission measurement. For reference, Food Blue No. 1 was diluted with ion-exchanged water to prepare a solution having a color value $E^{10\%}_{1\ cm}$ of 0.1, and the color tone of this solution was measured in the same manner.

The obtained results are shown in Table 1. As a result, it was confirmed that the *Gardenia* blue pigment obtained by reacting the soybean peptide, the sesame peptide, or the rice peptide with genipin under a non-supply of air and then reacting them under a supply of air had an L* value of 66 or more, an a* value of −24 or less, and a b* value of −25 or more when the *Gardenia* blue pigment was diluted to obtain a solution having a color value $E^{10\%}_{1\ cm}$ of 0.1, exhibited a bright and fresh blue color tone having reduced redness, and had a color tone closer to Food Blue No. 1 than the conventional *Gardenia* blue pigment (Examples 1-1 to 1-3). On the other hand, even when a blue pigment was produced under the same conditions using peptides other than the soybean peptide, the sesame peptide, and the rice peptide or amino acids, reddish blue (a high value of the a* value) was exhibited, and the color tone close to Food Blue No. 1 could not be obtained (Comparative Examples 1-1 to 1-15).

TABLE 1

| | Peptide or amino acid added | Maximum absorption wavelength (nm) | Measurement result | | | | | |
| --- | --- | --- | --- | --- | --- | --- | --- | --- |
| | | | L* value | a* value | b* value | c* value | h* value | ΔE*<sub>ab</sub> value[#3] |
| Example 1-1 | Soybean peptide (Hinute AM, FUJI OIL CO., LTD.)[#1] | 605.5 | 67.74 | −26.45 | −22.35 | 34.63 | 220.20 | 24.41 |
| Example 1-2 | Sesame peptide (Sesame Peptide KM-20, MARUZEN PHARMACEUTICALS CO., LTD.)[#2] | 609.5 | 65.75 | −30.81 | −20.98 | 37.27 | 214.25 | 25.25 |
| Example 1-3 | Rice peptide (rice peptide powder, Wuhan Tallyho Biological Product Co., Ltd.) | 604.5 | 70.19 | −27.66 | −24.53 | 36.97 | 221.57 | 22.20 |
| Comparative Example 1-1 | Fish collagen peptide (tripeptide derived from air bladder, Wuhan Tallyho Biological Product Co., Ltd.) | 600.0 | 67.11 | −22.75 | −29.08 | 36.92 | 231.96 | 28.05 |
| Comparative Example 1-2 | Walnut peptide (walnut peptide powder, Wuhan Tallyho Biological Product Co., Ltd.) | 602.0 | 66.67 | −22.4 | −29.15 | 36.76 | 232.46 | 28.58 |
| Comparative Example 1-3 | Pea peptide (pea peptide powder, Wuhan Tallyho Biological Product Co., Ltd.) | 602.0 | 67.28 | −22.23 | −30.03 | 37.36 | 233.49 | 28.48 |
| Comparative Example 1-4 | Sea cucumber peptide (sea cucumber oligomer peptide, Dalian Deep Blue Peptide Technology Research and Development Co., Ltd.) | 598.5 | 66.07 | −21.11 | −28.06 | 35.11 | 233.05 | 29.26 |
| Comparative Example 1-5 | Bitter gourd peptide (bitter gourd peptide powder, Wuhan Tallyho Biological Product Co., Ltd.) | 600.0 | 65.5 | −19.66 | −31.04 | 36.74 | 237.65 | 31.43 |
| Comparative Example 1-6 | Gelatin peptide (SCP-3100, Nitta Gelatin Inc.) | 598.0 | 62.37 | −17.04 | −26.64 | 31.62 | 237.40 | 33.89 |
| Comparative Example 1-7 | Casein peptide (KYOKUTO PEPTONE, KYOKUTO PHARMACEUTICAL INDUSTRIAL CO., LTD) | 597.5 | 62.49 | −15.67 | −31 | 34.74 | 243.18 | 35.73 |

TABLE 1-continued

| | Peptide or amino acid added | Maximum absorption wavelength (nm) | Measurement result | | | | | |
|---|---|---|---|---|---|---|---|---|
| | | | L* value | a* value | b* value | c* value | h* value | $\Delta E^*_{ab}$ value[#3] |
| Comparative Example 1-8 | Corn peptide (AMIFLEX AL-1, MC Food Specialties Inc.) | 592.5 | 62.69 | −13.57 | −30.71 | 33.57 | 216.16 | 36.60 |
| Comparative Example 1-9 | Wheat peptide (PROEXTRACT HVP-G, Bansyu Chomiryo Co. Ltd.) | 593.0 | 62.45 | −13.49 | −30.71 | 33.54 | 246.29 | 36.83 |
| Comparative Example 1-10 | Potato peptide (Amino Acid Gold, Cosmo Foods Corporation) | 592.0 | 62.52 | −12.08 | −30.29 | 32.61 | 248.26 | 37.44 |
| Comparative Example 1-11 | Silk powder peptide (Tango silk powder 100%, TANGO YU SILK Y Co., Ltd.) | 589.0 | 61.46 | −6.03 | −31.31 | 31.89 | 259.10 | 42.28 |
| Comparative Example 1-12 | Histidine | 595.5 | 67.09 | −17.74 | −29.61 | 34.52 | 239.07 | 30.58 |
| Comparative Example 1-13 | Glutamic acid | 593.0 | 66.22 | −13.51 | −31.37 | 34.16 | 246.70 | 34.24 |
| Comparative Example 1-14 | Arginine | 598.5 | 67.82 | −19.91 | −28.75 | 34.97 | 235.30 | 28.60 |
| Comparative Example 1-15 | Asparaginic acid | 593.0 | 67.25 | −16.64 | −30.94 | 35.13 | 241.73 | 31.54 |
| | Reference Example (Food Blue No. 1, KYORITSU FOODS CO, INC.) | 630.0 | 90.72 | −33.86 | −18.79 | 38.72 | 209.03 | Standard |

[#1]"Soybean peptide (Hinute AM, FUJI OIL CO., LTD.)" has a free amino acid content of 2 mass %, and has a peak area of the peptide having a molecular weight of 2000 or less of 78.1% of the total peak area in the analysis result according to a gel filtration chromatographic method using HPLC.
[#2]"Sesame peptide (Sesame Peptide KM-20, MARUZEN PHARMACEUTICALS CO., LTD.)" has a peak area of the peptide having a molecular weight of 2000 or less of 90% or more of the total peak area in the analysis result according to a gel filtration chromatographic method using HPLC.
[#3]The $\Delta E^*_{ab}$ value refers to a color difference value based on Food Blue No. 1 (Reference Example).

The *Gardenia* blue pigment-containing solution each obtained in Examples 1-1 to 1-3 was filtered, the pigment solution from which the insoluble matter had been removed was diluted with ion-exchanged water to prepare a solution having a color value $E^{10\%}_{1\ cm}$ of 0.05. The color tone of this solution was measured using an ultraviolet-visible spectrophotometer (V750 manufactured by JASCO Corporation) equipped with an integrating sphere. The obtained results are shown in Table 2. Also from this result, it was confirmed that the *Gardenia* blue pigment each obtained in Examples 1-1 to 1-3 exhibited a bright and fresh blue color tone having reduced redness.

TABLE 2

| | Peptide added | Measurement result | | |
|---|---|---|---|---|
| | | L* value | a* value | b* value |
| Example 1-1 | Soybean peptide | 76.07 | −17.36 | −16.42 |
| Example 1-2 | Sesame peptide | 77.09 | −18.82 | −15.03 |
| Example 1-3 | Rice peptide | 74.93 | −15.84 | −17.41 |

Test Example 2

1. Production of *Gardenia* Blue Pigment (Using Jar Fermenter) (Examples 2-1 to 2-5)

*Gardenia* blue pigments were produced in the same manner as in Test Example 1 above, except that soybean peptides shown in Table 3 were used in the reaction under an oxygen gas non-supply condition.

2. Measurement of Color Tone of *Gardenia* Blue Pigment

The color tone of the obtained *Gardenia* blue pigment was measured under the same conditions as in Test Example 1. The obtained results are shown in Table 3. From this result, it was confirmed that when a predetermined peptide and genipin were reacted under a non-supply of air and then reacted under a supply of air, the lower the free amino acid content of the peptide to be used, the better the color tone of the *Gardenia* blue pigment with suppressed redness was obtained.

TABLE 3

| | | Peptide used | | Measurement result | | | | |
|---|---|---|---|---|---|---|---|---|
| | Trade name | Free amino acid content (mass %) | Ratio (%) of peptide having molecular weight of 2000 or less[#] | L* value | a* value | b* value | c* value | h* value |
| Example 2-1 | Soybean peptide (soybean peptide powder, Wuhan Tallyho Biological Product Co., Ltd.) | Unmeasured | 80.0 | 66.8 | −28.2 | −23.53 | 36.73 | 219.84 |
| Example 2-2 | Soybean peptide (Hinute AM, FUJI OIL CO., LTD.) | 2 | 78.1 | 67.74 | −26.45 | −22.35 | 34.63 | 220.20 |
| Example 2-3 | Soybean peptide (Hinute DA, FUJI OIL CO., LTD.) | 5 | 76.8 | 69.18 | −27.81 | −24.28 | 36.92 | 221.12 |

TABLE 3-continued

| | | Peptide used | | | | | | |
|---|---|---|---|---|---|---|---|---|
| | | Free amino acid content (mass %) | Ratio (%) of peptide having molecular weight of 2000 or less[#] | Measurement result | | | | |
| | Trade name | | | L* value | a* value | b* value | c* value | h* value |
| Example 2-4 | Soybean peptide (Hinute DC6, FUJI OIL CO., LTD.) | 2 | 61.1 | 66.61 | −26.3 | −23.86 | 35.51 | 222.22 |
| Example 2-5 | Soybean peptide (Hinute D1, FUJI OIL CO., LTD.) | 1 | 45.8 | 65.98 | −26.6 | −23.92 | 35.77 | 221.96 |

[#]The "Ratio (%) of peptide having molecular weight of 2000 or less" refers to a value obtained by determining the ratio of the peak area of the peptide having a molecular weight of 2000 or less to the total peak area of the peptide from the analysis measurement according to a gel filtration chromatographic method using HPLC.

Test Example 3

1. Production of *Gardenia* Blue Pigment (Using Jar Fermenter) (Examples 3-1 to 3-3 and Comparative Example 3-1)

*Gardenia* blue pigments were produced in the same manner as in Test Example 1 above, except that a soybean peptide (Hinute AM, FUJI OIL CO., LTD.) was used as a peptide to be used, and the reaction time under an oxygen gas non-supply condition was changed to 0 hours (Comparative Example 3), 4 hours (Example 3-1), 5 hours (Example 3-2), and 22 hours (Example 3-3).

2. Production of *Gardenia* Blue Pigment (Using Jar Fermenter) (Comparative Example 3-2)

(1) Preparation of Genipin
A genipin-containing solution was prepared under the conditions shown in Test Example 1 above.
(2) Reaction under Oxygen Gas Supply Condition
To 283 g of water, 5.5 g of monosodium hydrogen phosphate dihydrate, 4.27 g of trisodium phosphate (anhydrous), and 76.1 g of a peptide or amino acid shown in Table 4 were added and dissolved. The obtained solution was mixed with the genipin-containing solution (total amount)

(3) Reaction under Oxygen Gas Non-Supply Condition
The reaction liquid after the reaction under an oxygen gas supply condition was adjusted to pH 7.0, and then reacted in an air-impermeable state at 35° C. for 18 hours under a gentle stirring condition in which air was not taken in. Thus, a *Gardenia* blue pigment-containing solution (solution after the reaction) was obtained.

3. Measurement of Color Tone of *Gardenia* Blue Pigment

The color tone of the obtained *Gardenia* blue pigment was measured under the same conditions as in Test Example 1. The obtained results are shown in Table 4. In Table 4, Food Blue No. 1 was diluted with ion-exchanged water to prepare a solution having a color value $E^{10\%}{}_{1\,cm}$ of 0.1, and the color tone of this solution was measured in the same manner. Also from this result, it was confirmed that when a predetermined peptide and genipin were reacted under a non-supply of air and then reacted under a supply of air, a *Gardenia* blue pigment exhibiting a bright and fresh blue color tone having reduced redness was obtained.

Evan when a predetermined peptide and genipin were reacted under a supply of air and then reacted under a non-supply of air, a *Gardenia* blue pigment exhibiting a bright and fresh blue color tone having reduced redness is not obtained.

TABLE 4

| | Reaction time (hrs) under oxygen gas non-supply condition | Measurement result | | | | | |
|---|---|---|---|---|---|---|---|
| | | L* value | a* value | b* value | c* value | h* value | ΔE*_{ab} value[#] |
| Comparative Example 3-1 | 0 | 65.87 | −19.56 | −30.99 | 36.65 | 237.74 | 31.16 |
| Example 3-1 | 4 | 67.60 | −25.71 | −28.45 | 38.35 | 227.90 | 26.35 |
| Example 3-2 | 5 | 67.89 | −26.44 | −26.80 | 37.65 | 225.39 | 25.31 |
| Example 3-3 | 22 | 67.97 | −25.93 | −28.14 | 38.27 | 227.34 | 25.84 |
| Comparative Example 3-2 (performing reaction under supply of air and then reaction under non-supply of air) | | 66.33 | −22.09 | −28.59 | 36.13 | 232.31 | 28.80 |
| Reference Example (Food Blue No. 1, KYORITSU FOODS CO, INC.) | | 90.72 | −33.86 | −18.79 | 38.72 | 209.03 | — |

[#]The ΔE*_{ab} value refers to a color difference value based on Food Blue No. 1 (Reference Example).

obtained above, and the pH was further adjusted to 7.5. The obtained solution was transferred to a jar fermenter with a 1 L capacity, and the reaction was performed under stirring conditions of 35° C. and 420 rpm while supplying air into the solution at a supply amount of 0.25 vvm until an increase in the color value leveled off. The reaction time was 33 hours.

Test Example 4

1. Production of *Gardenia* Blue Pigment (Using Jar Fermenter) (Example 4-1)

A *Gardenia* blue pigment was produced in the same manner as in Test Example 1 above, except that a soybean peptide (Hinute AM, FUJI OIL CO., LTD.) was used as a peptide to be used, and 1.2 g of transglycosylated hesperidin ($\alpha$-triglucosyl hesperidin content: 85 mass %, $\alpha$G HESPERIDIN PA-T, Ezaki Glico Co., Ltd.) was added to a solution to be subjected to a reaction under an oxygen gas non-supply condition.

2. Production of *Gardenia* Blue Pigment (Using Flask) (Example 4-2)

(1) Preparation of Genipin

First, a geniposide solution (color value $E^{10\%}_{1\ cm}$: 1240, measurement wavelength: 238 nm; geniposide content: about 45 mass %) extracted and purified from the fruit of *Gardenia* of the family Rubiaceae was prepared. In 39.11 g of purified water, 3.56 g of $\beta$-glucosidase activity containing cellulase (Sumizyme C, 1500 U/g, SHINNIHON CHEMIpigment-containing solution. The obtained results are shown in Table 5. In Table 5, the results obtained by measuring the color tone of a solution having a color value $E^{10\%}_{1\ cm}$ of 0.1 prepared by diluting Food Blue No. 1 with ion-exchanged water are also shown. As a result, it was confirmed that even when transglycosylated hesperidin was added at the time of reacting the soybean peptide with the genipin under an oxygen gas non-supply condition, by performing the reaction by supplying air after the reaction under a non-supply of air, a *Gardenia* blue pigment exhibiting a bright and fresh blue color tone having reduced redness was obtained.

The maximum absorption wavelength of the *Gardenia* blue pigment of Example 4-1 was 605.5 nm, and the maximum absorption wavelength of the *Gardenia* blue pigment of Example 4-2 was 608.0 nm.

TABLE 5

| | Production condition | | Measurement result | | | | | |
|---|---|---|---|---|---|---|---|---|
| | | Addition of | | | | | | |
| | Device used for reaction | transglycosylated hesperidin | L* value | a* value | b* value | c* value | h* value | $\Delta E^*_{ab}$ value[#] |
| Example 4-1 | Jar fermenter | Present | 70.75 | −28.74 | −25.61 | 38.49 | 221.70 | 21.71 |
| Example 1-2 | Flask | Present | 70.91 | −28.54 | −23.97 | 37.27 | 220.03 | 21.13 |
| Reference Example (Food Blue No. 1, KYORITSU FOODS CO, INC.) | | | 90.72 | −33.86 | −18.79 | 38.72 | 209.03 | — |

[#]The $\Delta E^*_{ab}$ value refers to a color difference value based on Food Blue No. 1 (Reference Example).

CALS Corporation) was dissolved, and 35.5 g of the geniposide solution (color value $E^{10\%}_{1\ cm}$ at the start of reaction: 245, measurement wavelength: 238 nm; geniposide concentration: about 0.2 mol/L) was added. Next, the pH of the solution was adjusted to 4.5, and then an enzymatic reaction was performed at 50° C. for 18 hours to obtain a genipin-containing solution (solution after the reaction).

(2) Reaction under Oxygen Gas Non-Supply Condition

To 75 g of water, 1.65 g of monosodium hydrogen phosphate dihydrate, 1.28 g of trisodium phosphate (anhydrous), 22.83 g of a soybean peptide (Hinute AM, FUJI OIL CO., LTD.), and 0.18 g of transglycosylated hesperidin ($\alpha$-triglucosyl hesperidin content: 85 mass %, $\alpha$G HESPERIDIN PA-T, Ezaki Glico Co., Ltd.) were added and dissolved. The obtained solution was mixed with the genipin-containing solution (total amount) obtained above, and the pH was further adjusted to 7.5. The obtained solution was transferred to a beaker with a 300 mL capacity, the beaker was hermetically sealed, and the solution was reacted in an air-impermeable state at 35° C. under a stirring condition (magnetic stirrer) of 100 rpm for 18 hours.

(3) Reaction under Oxygen Gas Supply Condition

The reaction liquid after the reaction under an oxygen gas non-supply condition was adjusted to pH 7.0 and then transferred to a flask with a 500 mL capacity, and the reaction was performed at 35° C. for 30 hours under a stirring condition of 150 rpm in a state where the mouth of the flask opened to the air atmosphere until an increase in the color value leveled off. Thus, a *Gardenia* blue pigment-containing solution (solution after the reaction) was obtained.

3. Measurement of Color Tone of *Gardenia* Blue Pigment

The color tone was measured in the same manner as in Test Example 1 above using the obtained *Gardenia* blue

Test Example 5

1. Production of Blue Pigment Using Purified Genipin (Using Flask) (Examples 5-1 to 5-4)

(1) Reaction Under Oxygen Gas Non-Supply Condition 1.65 g of monosodium hydrogen phosphate dihydrate, 1.28 g of trisodium phosphate (anhydrous), 8.31 g of purified genipin (genipin content: 98 mass %, trade name: Genipin, manufactured by GLICO NUTRITION CO., LTD.), a predetermined amount of peptide shown in Table 6, 0 g or 0.38 g of transglycosylated hesperidin ($\alpha$-triglucosyl hesperidin content: 85 mass %, $\alpha$G HESPERIDIN PA-T, Ezaki Glico Co., Ltd.), and a balance of water were added to be a total amount of 180 g and dissolved. The pH of the obtained solution was adjusted to 7.5 and then transferred to a beaker with a 300 mL capacity, the beaker was hermetically sealed, and the solution was reacted in an air-impermeable state at 35° C. under a stirring condition (magnetic stirrer) of 100 rpm for 18 hours.

(2) Reaction Under Oxygen Gas Supply Condition

The reaction liquid after the reaction under an oxygen gas non-supply condition was adjusted to pH 7.0 and then transferred to a flask with a 500 mL capacity, and the reaction was performed at 35° C. for 48 hours under a stirring condition of 150 rpm in a state where the mouth of the flask opened to the air atmosphere until an increase in the color value leveled off. Thus, a blue pigment-containing solution (solution after the reaction) was obtained.

2. Measurement of Color Tone of Blue Pigment

The color tone was measured in the same manner as in Test Example 1 above using the obtained blue pigment-containing solution. The obtained results are shown in Table 6. In Table 6, the results obtained by measuring the color tone of a solution having a color value $E^{10\%}_{1\ cm}$ of 0.1 prepared by diluting Food Blue No. 1 with ion-exchanged water are also shown. As a result, it was confirmed that even when the purified genipin was used as a raw material, the blue pigment obtained by reacting the soybean peptide, the sesame peptide, or the rice peptide with the purified genipin under a non-supply of air and then reacting them under a supply of air had an L* value of 66 or more, an a* value of −24 or less, and a b* value of −25 or more when the blue pigment was diluted to obtain a solution having a color value $E^{10\%}_{1\ cm}$ of 0.1, and exhibited a bright and fresh blue color tone having reduced redness (Examples 5-1 to 5-4).

That is, from the present results, it was found that even when not only genipin prepared from geniposide extracted and purified from *Gardenia* of the family Rubiaceae was used, but also genipin extracted and purified from huito, genipin prepared from geniposide extracted and purified from huito, genipin obtained by a genetic engineering technique, genipin prepared from geniposide obtained by a genetic engineering technique, or the like was used, a blue pigment exhibiting a bright and fresh blue color tone having reduced redness was obtained by reacting the genipin with the soybean peptide, the sesame peptide, or the rice peptide under a non-supply of air and then reacting them under a supply of air.

GLICO NUTRITION CO., LTD.), 9 mL of 99.5% ethanol, and 2.05 g of sodium glutamate monohydrate were dissolved in water. The obtained solution was placed in a flask and placed in a water bath at 75° C. to perform a reaction for 6 hours under the condition of 150 strokes/min. The ethanol in the reaction liquid after the reaction was removed by an evaporator and then freeze-dried to obtain a powdery *Gardenia* blue pigment.

2. Measurement of Color Tone of *Gardenia* Blue Pigment

The obtained *Gardenia* blue pigment was diluted with ion-exchanged water to prepare a solution having a color value $E^{10\%}_{1\ cm}$ of 0.0337, and the color tone was measured using a spectrophotometric colorimeter (CM-5 Konica Minolta, Inc.). As measurement conditions, a light source was set to D65, a visual field was set to 10° C., a measurement diameter was set to φ20 mm, and an irradiation diameter was set to φ26 mm in the total transmission measurement. For reference, the *Gardenia* blue pigment-containing solution obtained in Example 1-1 was diluted

TABLE 6

| | Peptide added | | Presence/ absence of | Maximum absorption | Measurement result | | | | | |
|---|---|---|---|---|---|---|---|---|---|---|
| | Type | Addition amount | transglycosylated hesperidin | wavelength (nm) | L* value | a* value | b* value | c* value | h* value | $\Delta E^*_{ab}$ value[#1] |
| Example 5-1 | Soybean peptide (Hinute AM, FUJI OIL CO., LTD.) | 22.83 g | Absent | 607.5 | 67.77 | −28.89 | −23.87 | 37.48 | 219.56 | 24.03 |
| Example 5-2 | Soybean peptide (Hinute AM, FUJI OIL CO., LTD.) | 22.83 g | Present | 606.5 | 67.52 | −28.90 | −24.17 | 37.68 | 219.91 | 24.33 |
| Example 5-3 | Rice peptide (rice peptide powder, Wuhan Tallyho Biological Product Co., Ltd.) | 22.83 g | Absent | 608.0 | 68.02 | −29.10 | −24.18 | 37.83 | 219.72 | 23.81 |
| Example 5-4 | Sesame peptide (Sesame Peptide KM-20, MARUZEN PHARMACEUTICALS CO., LTD.) | 30.43 g | Absent | 610.5 | 68.33 | −31.92 | −22.02 | 38.78 | 214.59 | 22.70 |
| | Reference Example (Food Blue No. 1, KYORITSU FOODS CO, INC.) | | — | 630.0 | 90.72 | −33.86 | −18.79 | 38.72 | 209.03 | Standard |

[#1]The $\Delta E^*_{ab}$ value refers to a color difference value based on Food Blue No. 1 (Reference Example).

Test Example 6

1. Production of *Gardenia* Blue Pigment (Using Flask) (Reference Example 1)

A *Gardenia* blue pigment was produced according to the method of Example 2 described in Patent Document 3 (WO 2017/156744 A). Specifically, 0.6 g of genipin (purity: 98%, with ion-exchanged water to prepare a solution having an adjusted color value $E^{10\%}_{1\ cm}$ of 0.0337, and the color tone was measured in the same manner also for these solutions.

The results are shown in Table 7. As a result, it was confirmed that the *Gardenia* blue pigment obtained by the method of Patent Document 3 had a high a* value and exhibited a reddish color tone.

TABLE 7

| | | Measurement result | | | | |
|---|---|---|---|---|---|---|
| | | L* value | a* value | b* value | c* value | h* value |
| Reference Example 1 | Solution having a color value $E^{10\%}_{1\ cm}$ of 0.0337 | 86.43 | −8.26 | −13.52 | 15.85 | 238.57 |
| Example 1-1 | Solution having a color value $E^{10\%}_{1\ cm}$ of 0.0337 | 85.37 | −14.51 | −13.15 | 19.58 | 222.19 |

Test Example 7

1. Production of *Gardenia* Blue Pigment (Comparative Examples 7-1 to 7-3)

(1) Enzyme Treatment in Presence of Peptide and Reaction Under Oxygen Gas Non-Supply Condition First, a geniposide solution (color value $E^{10\%}_{1\ cm}$: 1240, measurement wavelength: 238 nm; geniposide content: about 45 mass %) extracted and purified from the fruit of *Gardenia* of the family Rubiaceae was prepared. In 39.11 g of purified water, 3.56 g of β-glucosidase activity containing cellulase (Sumizyme C, 1500 U/g, SHINNIHON CHEMI-CALS Corporation) was dissolved, and 35.5 g of the geniposide solution (color value $E^{10\%}_{1\ cm}$ at the start of reaction: 245, measurement wavelength: 238 nm; geniposide concentration: about 0.2 mol/L) was added. Next, 1.65 g of monosodium hydrogen phosphate dihydrate, 1.28 g of trisodium phosphate (anhydrous), a predetermined amount of peptide

2. Measurement of Color Tone of Blue Pigment

The color tone was measured in the same manner as in Test Example 1 above using the obtained *Gardenia* blue pigment-containing solution. The obtained results are shown in Table 8. In Table 8, the results obtained by measuring the color tone of a solution having a color value $E^{10\%}_{1\ cm}$ of 0.1 prepared by diluting Food Blue No. 1 with ion-exchanged water are also shown. As a result, when the soybean peptide, the sesame peptide, or the rice peptide was reacted under a non-supply of air simultaneously with the enzymatic reaction from geniposide to genipin, and then reacted under a supply of air, the maximum absorption wavelength was decreased, and when Food Blue No. 1 was diluted to obtain a solution having a color value $E^{10\%}_{1\ cm}$ of 0.1, all of the L* value of 66 or more, the a* value of −4 or less, and the b* value of −5 or more were not satisfied, and a fresh blue color tone having reduced redness was not observed.

TABLE 8

| | Peptide added | Addition amount (g) | Maximum absorption wavelength (nm) | Measurement result | | | | | |
|---|---|---|---|---|---|---|---|---|---|
| | | | | L* value | a* value | b* value | c* value | h* value | $\Delta E^*_{ab}$ value[#] |
| Comparative Example 7-1 | Soybean peptide (Hinute AM, FUJI OIL CO., LTD.) | 22.83 | 601.5 | 64.98 | −22.34 | −25.26 | 33.72 | 228.52 | 28.93 |
| Comparative Example 7-2 | Rice peptide (rice peptide powder, Wuhan Tallyho Biological Product Co., Ltd.) | 22.83 | 601.5 | 64.77 | −22.74 | −24.80 | 33.65 | 227.49 | 28.86 |
| Comparative Example 7-3 | Sesame peptide (Sesame Peptide KM-20, MARUZEN PHARMACEUTICALS CO., LTD.) | 30.43 | 606.0 | 64.67 | −24.96 | −22.94 | 33.90 | 222.59 | 27.84 |

[#]The $\Delta E^*_{ab}$ value refers to a color difference value based on Food Blue No. 1 (Reference Example).

shown in Table 8, and a balance of water were added to be a total amount of 180 g and dissolved. The obtained solution was transferred to a beaker with a 300 mL capacity, the pH of the solution was adjusted to 4.5 to 4.8, the beaker was hermetically sealed, and the solution was simultaneously subjected to an enzymatic reaction in the presence of a peptide and a reaction under an oxygen gas non-supply condition in an air-impermeable state at 50° C. under a stirring condition (magnetic stirrer) of 100 rpm for 18 hours.

(2) Reaction Under Oxygen Gas Supply Condition

The reaction liquid after the reaction under an oxygen gas non-supply condition was adjusted to pH 7.0 and then transferred to a flask with a 500 mL capacity, and the reaction was performed at 35° C. for 48 hours under a stirring condition of 150 rpm in a state where the mouth of the flask opened to the air atmosphere until an increase in the color value leveled off. Thus, a *Gardenia* blue pigment-containing solution (solution after the reaction) was obtained.

Test Example 8

1. Production of *Gardenia* Blue Pigment (Using Flask) (Example 8-1)

(1) Preparation of Genipin

First, a geniposide solution (color value $E^{10\%}_{1\ cm}$: 1335.48, measurement wavelength: 238 nm; geniposide content: about 45 mass %) extracted and purified from the fruit of *Gardenia* of the family Rubiaceae was prepared. In 41.67 g of purified water, 4.17 g of β-glucosidase activity containing cellulase (Sumizyme C, 1500 U/g, SHINNIHON CHEMICALS Corporation) was dissolved, and 41.67 g of the geniposide solution (color value $E^{10\%}_{1\ cm}$ at the start of reaction: 245, measurement wavelength: 238 nm; geniposide concentration: about 0.2 mol/L) was added. Next, the pH of the solution was adjusted to 4.5, and then an enzymatic reaction was performed at 50° C. for 18 hours to obtain a genipin-containing solution (solution after the reaction).

(2) Reaction Under Oxygen Gas Non-Supply Condition

To 75 g of water, 1.65 g of monosodium hydrogen phosphate dihydrate, 1.28 g of trisodium phosphate (anhydrous), and 22.83 g of a rice peptide (rice peptide powder, Wuhan Tallyho Biological Product Co., Ltd.) were added and dissolved. The obtained solution was mixed with the genipin-containing solution (total amount) obtained above, and the pH was further adjusted to 7.5. The obtained solution was transferred to a beaker with a 300 mL capacity, the beaker was hermetically sealed, and the solution was reacted in an air-impermeable state at 35° C. under a stirring condition (magnetic stirrer) of 100 rpm for 18 hours.

(3) Reaction Under Oxygen Gas Supply Condition

The reaction liquid after the reaction under an oxygen gas non-supply condition was adjusted to pH 7.0 and then transferred to a flask with a 500 mL capacity, and the reaction was performed at 35° C. for 48 hours under a stirring condition of 150 rpm in a state where the mouth of the flask opened to the air atmosphere until an increase in the color value leveled off. Thus, a *Gardenia* blue pigment-containing solution (solution after the reaction) was obtained.

2. Measurement of Acid Heating Resistance of *Gardenia* Blue Pigment

The obtained *Gardenia* blue pigment-containing solution was diluted with a 0.1 M citrate buffer solution having a pH of 2.5 to prepare a solution A (color value $E^{10\%}_{1\ cm}$: 0.1). The obtained *Gardenia* blue pigment-containing solution was diluted with a 0.1 M citrate buffer solution having a pH of 6.0 to prepare a solution B (color value $E^{10\%}_{1\ cm}$: 0.1). The solutions A and B were left to stand still at 5° C. for about 18 hours, and then the solution A was heat-treated at 90° C. for 15 minutes. The solution B was not heat-treated. The solutions A and B were centrifuged at 3,000 rpm for 10 minutes with a centrifuge, and the absorbance of the supernatant at a maximum absorption wavelength around 600 nm was measured. The ratio of the absorbance of the solution A to the absorbance of the solution B when the absorbance of the solution B was taken as 100% was determined, and this ratio was taken as the residual ratio when the heat treatment was performed at 90° C. for 15 minutes under the condition of a pH of 2.5.

The color tones of the solution A after the heat treatment and the solution B not heat-treated (after being left to stand still at 5° C. for about 18 hours) were used using a spectrophotometric colorimeter (CM-5 Konica Minolta, Inc.). As measurement conditions, a light source was set to D65, a visual field was set to 10° C., a measurement diameter was set to φ20 mm, and an irradiation diameter was set to φ26 mm in the total transmission measurement.

The results are shown in Table 9. From this result, the *Gardenia* blue pigment obtained by reacting the rice peptide with genipin under an oxygen gas non-supply condition and then reacting them under a supply of an oxygen gas had an L* value of 64 or more, an a* value of −4 or less, and a b* value of −1 or more even when heated under the condition of a pH of 2.5 (color value $E^{10\%}_{1\ cm}$: 0.1), and further had a ΔE*_{ab} of 3.5 or less even when compared with the condition of a pH of 6.0 (color value $E^{10\%}_{1\ cm}$: 0.1) in which heating was not performed, and thus had excellent acid heating resistance.

TABLE 9

| | | Measurement result | | | | | |
| | | Residual ratio (%) | L* value | a* value | b* value | c* value | ΔE*_{ab} value[#] |
|---|---|---|---|---|---|---|---|
| Example 8-1 | Solution A after heat treatment (pH 2.5) | 97.63 | 66.75 | −21.98 | −24.01 | 32.55 | 2.89 |
| | Solution B not heat-treated (pH 6.0) | — | 68.27 | −24.43 | −24.26 | 34.43 | Standard |

[#]The ΔE*_{ab} value refers to a color difference value based on the solution B not heat-treated.

Test Example 9

1. Production of Blue Pigment Using Purified Genipin (Using Flask) (Examples 5-1 to 5-4)

(1) Reaction under Oxygen Gas Non-Supply Condition

To 145.93 g of water, 1.65 g of monosodium hydrogen phosphate dihydrate, 1.28 g of trisodium phosphate (anhydrous), 8.31 g of purified genipin (genipin content: 98 mass %, trade name Genipin, manufactured by GLICO NUTRITION CO., LTD.), and 22.83 g of a rice peptide (rice peptide powder, Wuhan Tallyho Biological Product Co., Ltd.) were added and dissolved. The pH of the obtained solution was adjusted to 7.5 and then transferred to a beaker with a 300 mL capacity, the beaker was hermetically sealed, and the solution was reacted in an air-impermeable state at 35° C. under a stirring condition (magnetic stirrer) of 100 rpm for 18 hours.

(2) Reaction under Oxygen Gas Supply Condition

The reaction liquid after the reaction under an oxygen gas non-supply condition was adjusted to pH 6.0 and then transferred to a flask with a 500 mL capacity, and the reaction was performed at 35° C. for 46 hours under a stirring condition of 150 rpm in a state where the mouth of the flask opened to the air atmosphere until an increase in the color value leveled off. Thus, a blue pigment-containing solution (solution after the reaction) was obtained.

2. Measurement of Acid Heating Resistance of Blue Pigment

The acid heating resistance was measured under the same conditions as in Test Example 8. The results are shown in Table 10. From this result, the blue pigment obtained by reacting the purified genipin with the rice peptide under an oxygen gas non-supply condition and then reacting them under a supply of an oxygen gas had an L* value of 64 or more, an a* value of −4 or less, and a b* value of −1 or more even when heated under the condition of a pH of 2.5 (color value $E^{10\%}_{1\ cm}$: 0.1), and further had a ΔE*_{ab} of 3.5 or less even when compared with the condition of a pH of 6.0 (color value $E^{10\%}_{1\ cm}$: 0.1) in which heating was not performed, and thus had excellent acid heating resistance.

That is, from the present results, it has become clear that even when genipin was not derived from *Gardenia* of the family Rubiaceae, a blue pigment having excellent acid heating resistance was obtained by reacting the genipin with the rice peptide under a non-supply of air and then reacting them under a supply of air.

amount of (60% aqueous ethanol solution) as an extraction solvent. After the solvent extraction treatment, the solid content is removed by filtration to recover the extraction liquid. An equal amount of ethyl acetate is added to the obtained extraction liquid and stirred to dissolve genipin in an ethyl acetate layer. Next, the ethyl acetate layer is

TABLE 10

| | | Measurement result | | | | | |
|---|---|---|---|---|---|---|---|
| | | Residual ratio (%) | L* value | a* value | b* value | c* value | ΔE*$_{ab}$ value[#] |
| Example 9-1 | Solution A after heat treatment (pH 2.5) | 102.0 | 65.22 | −23.91 | −27.63 | 36.54 | 3.41 |
| | Solution B not heat-treated (pH 6.0) | — | 67.78 | −26.12 | −27.20 | 37.71 | Standard |

[#]The ΔE*$_{ab}$ value refers to a color difference value based on the solution B not heat-treated.

Test Example 10

1. Production of *Gardenia* Blue Pigment (Using Flask) (Comparative Examples 7-1 to 7-5)

*Gardenia* blue pigments were produced under the same conditions as in Example 8-1, except that a peptide or amino acid shown in Table 10 was used instead of the rice peptide.

2. Measurement of Acid Heating Resistance of *Gardenia* Blue Pigment

The acid heating resistance was measured under the same conditions as in Test Example 8. The results are shown in Table 11. As a result, it was confirmed that the obtained *Gardenia* blue pigment could not have acid heating resistance even when the peptide other than the rice peptide was reacted with genipin under a non-supply of air and then reacted under a supply of air.

separated, concentrated under reduced pressure, and crystallized, and then the genipin crystals are recovered and dried, so that genipin crystals (purity of 70 mass % or more) is obtained.

Next, to 145.93 g of water, 8.31 g of the genipin crystals obtained above, 1.65 g of monosodium hydrogen phosphate dihydrate, 1.28 g of trisodium phosphate (anhydrous), and 22.83 g of a soybean peptide, a sesame peptide, or a rice peptide are added and dissolved. The pH of the obtained solution is adjusted to 7.5 and then transferred to a beaker with a 300 mL capacity, the beaker is hermetically sealed, and the solution is reacted in an air-impermeable state at 35° C. under a stirring condition (magnetic stirrer) of 100 rpm for 18 hours. Next, the reaction liquid after the reaction under an oxygen gas non-supply condition is adjusted to pH 7.0 and then transferred to a flask with a 500 mL capacity, and the reaction is performed at 35° C. for 48 hours under a stirring condition of 150 rpm in a state where the mouth of the flask opens to the air atmosphere until an increase in the

TABLE 11

| | Peptide added | | Measurement result | | | | |
|---|---|---|---|---|---|---|---|
| | | | L* value | a* value | b* value | c* value | ΔE*$_{ab}$ value[#] |
| Comparative Example 8-1 | Silk powder peptide (Tango silk powder 100%, TANGO YU SILK Y |Co., Ltd.) | Solution A after heat treatment (pH 2.5) | 64.38 | −1.27 | −25.04 | 25.07 | 5.72 |
| | | Solution B not heat-treated (pH 6.0) | 63.26 | −3.65 | −30.11 | 30.33 | — |
| Comparative Example 8-2 | Pea peptide (pea peptide powder, Wuhan Tallyho Biological Product Co., Ltd.) | Solution A after heat treatment (pH 2.5) | 65.45 | −17.29 | −29.50 | 34.19 | 6.17 |
| | | Solution B not heat-treated (pH 6.0) | 68.96 | −17.31 | −24.42 | 29.93 | — |
| Comparative Example 8-3 | Sea cucumber peptide (sea cucumber oligomer peptide, Dalian Deep Blue Peptide Technology Research and Development Co., Ltd.) | Solution A after heat treatment (pH 2.5) | 66.53 | −15.33 | −23.03 | 27.67 | 6.38 |
| | | Solution B not heat-treated (pH 6.0) | 66.75 | −19.75 | −27.62 | 33.95 | — |
| Comparative Example 8-4 | Fish collagen peptide (tripeptide derived from air bladder, Wuhan Tallyho Biological Product Co., Ltd.) | Solution A after heat treatment (pH 2.5) | 58.32 | −14.24 | −31.41 | 34.48 | 8.04 |
| | | Solution B not heat-treated (pH 6.0) | 62.10 | −16.52 | −30.00 | 34.25 | — |
| Comparative Example 8-5 | Histidine | Solution A after heat treatment (pH 2.5) | 68.18 | −13.24 | −26.92 | 30.00 | 3.20 |
| | | Solution B not heat-treated (pH 6.0) | 69.67 | −15.19 | −27.23 | 31.18 | — |

[#]The ΔE*$_{ab}$ value refers to a color difference value based on the solution B not heat-treated.

Production Example 1

The flesh of *Genipa americana* is finely cut, and then subjected to a solvent extraction treatment using twice the color value levels off. Thus, a blue pigment-containing solution exhibiting a bright and fresh blue color tone having reduced redness is obtained using genipin derived from *Genipa americana* as a raw material.

The invention claimed is:

1. A blue pigment comprising a reaction product of a primary amino group-containing compound and genipin, wherein when the blue pigment is diluted with water to obtain a solution having a color value $E^{10\%}_{1\ cm}$ of 0.1, an L* value is 66 or more, an a* value is −24 or less, and a b* value is −25 or more in an Lab color space.

2. The blue pigment according to claim 1, wherein when operations (1) to (3) below are performed, a color difference $\Delta E^*_{ab}$ between a solution A heat-treated at 90° C. for 15 minutes and a solution B not heat-treated is 3.5 or less, and the solution A heat-treated at 90° C. for 15 minutes has an L* value of 64 or more, an a* value of −14 or less, and a b* value of −31 or more;

operation conditions are:

(1) a preparation, wherein the blue pigment is diluted with a 0.1 M citrate buffer solution having a pH of 2.5 to prepare a solution A having a color value $E^{10\%}_{1\ cm}$ of 0.1, and the blue pigment is diluted with a 0.1 M citrate buffer solution having a pH of 6.0 to prepare a solution B having a color value $E^{10\%}_{1\ cm}$ of 0.1;

(2) a heat treatment of the solutions, wherein the solution A is heat-treated at 90° C. for 15 minutes, and the solution B is not heat-treated; and (3) measurement of color tone, wherein the L* value, the a* value, and the b* value in the Lab color space are measured for the solution A heat-treated at 90° C. for 15 minutes and the solution B not heat-treated.

3. The blue pigment according to claim 1, wherein a maximum absorption wavelength is present in a region of 604 nm or more.

4. The blue pigment according to claim 1, wherein the genipin is derived from *Gardenia* of the family Rubiaceae, *Genipa americana*, or a genetically modified microorganism.

5. A food or beverage product colored with the blue pigment according to claim 1.

\* \* \* \* \*